US007170944B1

(12) United States Patent
Liu et al.

(10) Patent No.: US 7,170,944 B1
(45) Date of Patent: Jan. 30, 2007

(54) ITERATIVE ASSESSMENT OF MULTIPATH SIGNAL PRESENCE

(75) Inventors: Qin Liu, Fremont, CA (US); Lin Yang, Fremont, CA (US)

(73) Assignee: Legend Silicon Corporation, Fremont, CA (US)

( * ) Notice: Subject to any disclaimer, the term of this patent is extended or adjusted under 35 U.S.C. 154(b) by 905 days.

(21) Appl. No.: 10/291,154

(22) Filed: Nov. 7, 2002

(51) Int. Cl.
*H04L 27/28* (2006.01)
*H04J 11/00* (2006.01)

(52) U.S. Cl. .................................. 375/260; 370/208
(58) Field of Classification Search ............... 375/144, 375/148, 219, 259, 260, 316; 370/208, 210, 370/321, 337, 347; 708/404, 405
See application file for complete search history.

(56) References Cited

U.S. PATENT DOCUMENTS

| 6,563,885 B1 * | 5/2003 | Magee et al. ............... 375/316 |
| 6,801,580 B2 * | 10/2004 | Kadous ....................... 375/267 |
| 7,023,931 B2 * | 4/2006 | Magee et al. ............... 375/262 |
| 2002/0042661 A1 * | 4/2002 | Kim ............................. 700/94 |

\* cited by examiner

*Primary Examiner*—Young T. Tse
(74) *Attorney, Agent, or Firm*—Patent Law Group LLP; Carmen C. Cook (57) ABSTRACT

Method and system for determining whether one or more multipath signals is present in a received signal frame that includes a reference symbol (RS) sequence RS(t;m1) as part of the frame, and for iteratively evaluating a multipath signal that is present. The RS sequence index (m1) for the frame is identified, and first and second Fourier transforms $\Phi(f;m1;ref)$ and $\Phi(f;rec)$ for the received frame are provided for a selected time segment IS that includes the RS sequence of the received frame. An inverse Fourier transform $\sigma(t;m1)$ of the ratio of the transforms is computed and analyzed. If at least one multipath signal is present, $\sigma(t;m1)$ is nonlinearly filtered, and the filtered function is convolved with $RS(t;m1)$. This convolution represents a received signal extension, due to multipath signal(s) presence. A refinement procedure analyzes a contribution to multipath signals from the preceding frame(s). The procedure is iteratively driven toward an optimal representation of any multipath signal(s) present.

20 Claims, 6 Drawing Sheets

ITERATIVE ASSESSMENT OF MULTIPATH SIGNAL PRESENCE

FIELD OF THE INVENTION

This invention relates to determination of strengths and arrival times of multipath signals associated with a direct signal.

BACKGROUND OF THE INVENTION

When a transmitted signal is received by a receiver, one or more frames of the direct signal are often accompanied by multipath signals, at times following the direct signal arrival time, representing a version of the direct signal that has been altered by reflection from one or more signal-reflecting surfaces. The amplitude and phase associated with a multipath signal are arbitrary, relative to the amplitude and phase of the direct signal. At each signal sampling point, a multipath signal can combine additively or subtractively with the corresponding direct signal, and with any other signal being received at about the same time.

What is needed is an approach for quickly determining, as each frame is received, whether one or more multipath signals is present in the frame and for estimating a time delay associated with appearance of a multipath signal, if present. Preferably, the approach should allow use with arbitrary frame size and should provide a record, if desired, of one or more characteristics associated with a multipath signals that appears in a frame.

SUMMARY OF THE INVENTION

These needs are met by the invention, which provides a system and associated method for quantitatively estimating times of arrival of one or more multipath signals associated with a direct signal. The received signal frame includes a unique reference symbol (RS) sequence (which may be, but is not necessarily, a pseudo-noise or PN sequence). A multipath signal can arrive within an interrogation segment (IS) time interval, consisting of a first time interval of length L1, corresponding to the RS sequence plus a second augmenting time interval of length D that follows the RS sequence (both expressed in time units $\Delta t(sym)$ of symbol length). Fourier transforms (FTs) of the IS for the received frame and of a corresponding RS sequence (with a corresponding index m1) are formed in digital format. The augmented portion of the IS for the reference sequence, of length D, is optionally filled with zeroes or with a replica of a portion of the original (non-augmented) RS sequence. A ratio of the FT of the received frame divided by the FT of the augmented RS sequence, computed over the IS, is formed, and an inverse Fourier transform $\sigma(t;m1;1)$ of this ratio is computed.

An amplitude-dependent filter is applied to $\sigma(t;m1;1)$ to remove substantially all background noise. The resulting channel signal includes the direct signal and may include one or more multipath signals present in the original signal frame. The channel signal is convolved with the original RS sequence to provide a function that allows an improved estimate $D_1$ of the length D of the augmenting time interval and allows a reduction of estimated background noise level $n_1$ associated with the inverse transform $\sigma(t;m1;1)$.

The preceding process is then iterated. A Fourier transform of a modified IS signal and of the RS sequence, each of length $L1+D_1$, are formed, and an inverse transform $\sigma(t;m1;2)$ of the ratio of these transforms is computed. Amplitude-dependent filtering is applied to the function $\sigma(t;m1;2)$ to produce another channel signal, which allows a further improved estimate $D_2$ of the length of the augmenting time interval and a further reduction of estimated background noise level $n_2$ associated with the inverse transform $\sigma(t;m1;2)$. This process is further iterated until a selected convergence condition, such as $|<n_{k-1}>-<n_k>| \leq <\epsilon$(thr) or $|<n_k>| \leq \epsilon$(thr), is satisfied, where $\epsilon$(thr) is a selected small number.

This approach also allows estimates to be made of the strength and/or the time of arrival of one or more multipath signals within the received frame.

DESCRIPTION OF BEST MODES OF THE INVENTION

Figure 1:
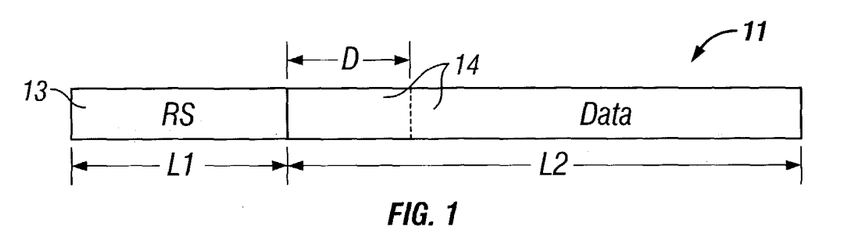
FIG. 1 illustrates a frame that is received and processed according to the invention.

FIG. 1 illustrates a frame 11 that is received and analyzed according to the invention. Expressed in time units of the length $\Delta t(sym)$ of each transmitted symbol, a frame 11 includes a RS sequence 13 of length L1 (optionally including a pre-amble or post-amble) and a data section 14 of length L2, expressed in units $\Delta t(sym)$ of temporal length of a symbol. In one version, L1=420 and L2=3780. Each frame in a consecutive sequence of received frames has a different RS sequence embedded therein so that, by comparing the embedded RS sequence with a table of RS sequences, a received frame can be identified and assigned a place in the consecutive sequence. FIG. 1 also indicates an estimated maximum time delay D beyond the end of the RS sequence or segment in a frame, for appearance of a multipath signal. The frame, including the RS sequence, may be mildly or seriously corrupted by presence of one or more multipath signals.

Figure 2:
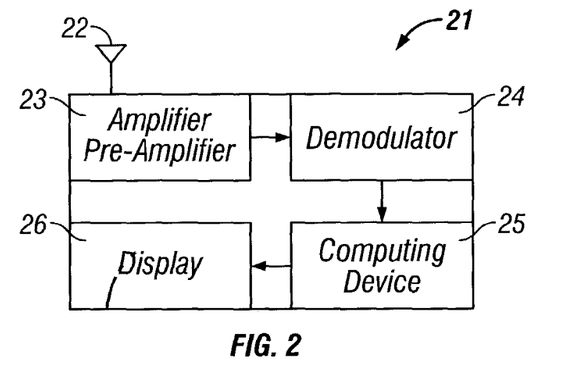
FIG. 2 is a schematic view of a signal processing system configures to practice an embodiment of the invention.

FIG. 2 is a schematic view of a receiver system 21 configured to practice the invention. The system 21 includes a signal antenna 22 or other signal-receiving mechanism, a signal pre-amplifier and amplifier 23 (optional) that receives and initially processes the received signal, a demodulator mechanism 24, a computing device 25 programmed to practice the invention, and a display mechanism 26 (optional) to display selected results of processing of the received signal by the computing device. The computing device includes programs for computing a Fourier transform and an inverse Fourier transform, for implementing an amplitude-dependent signal filter, and for estimating a new length of the time delay quantity (D), whose uses are discussed in the following.

When a frame is received by the computer, the computer identifies the RS segment of the frame (e.g., by a frame index value m1) and an index number (m1) of the corresponding RS sequence, provides or computes a Fourier transform $\Phi(f;ref/m1)=FT\{RS(t;m1)\}$ of the identified RS segment, and provides or computes a Fourier transform $\Phi(f;rec)=FT\{s(t;rec)\}$ of a received frame (where the computation interval IS has a length L1+D), using a fast Fourier transform or another suitable technique for computing or providing the transform. One can, for example, use D=L1 as an estimate so that the length of each IS is 2·L1 units. Optionally, the FTs, $\Phi(f;ref/m1)$ and $\Phi(f;rec)$, can be provided using a convenient computation length CL, where CL≧L1+D, where the residual of the IS, of length CL−L1−D, is stuffed with a sequence of known values, such as {0,0,0, . . . }, {0,1,0,1, . . . } or other selected binary sequence. For example, if $2^q<L1+D\leq 2^{q+1}$, the length CL can be $CL=2^{q+1}$. An example is L1=420, 92<D≦604 and $CL=2^{10}=1024$.

Figure 3A:
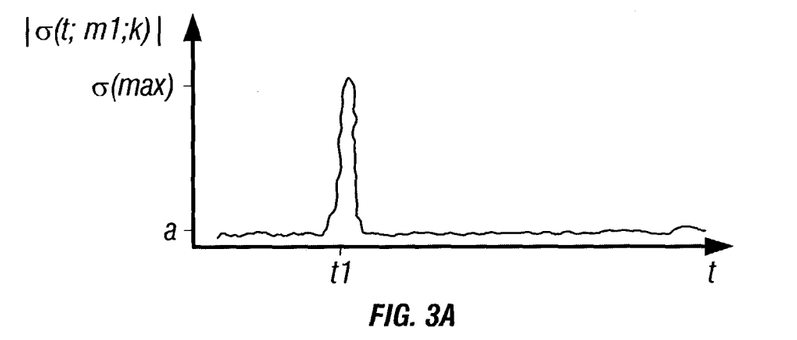
FIGS. 3A and 3B graphically illustrate the inverse Fourier transform $\sigma(t;m1;1)$ where only a direct signal is present and where a direct signal plus a multipath signal is present, respectively.
Figure 3B:
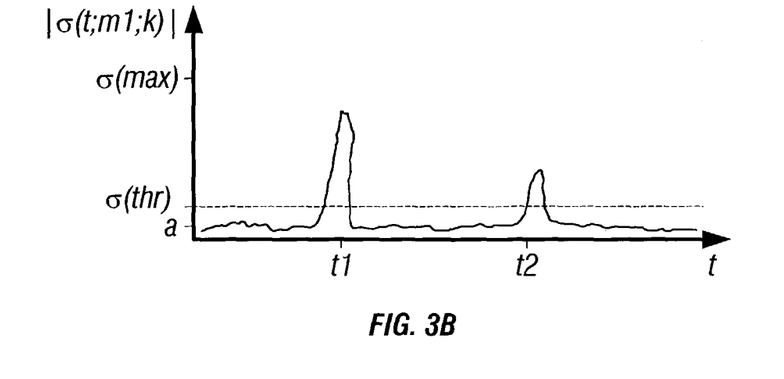

The computer divides the transform $\Phi(f;ref/m1)$ into the received frame transform $\Phi(f;rec)$ to form a ratio $$\rho(f;m1)=\Phi(f;rec)/\Phi(f;ref/m1), \quad (1)$$

which depends upon the frequency variable f, using any suitable technique for division of a first digital number by a second digital number. The system 21 then forms a (first) inverse Fourier transform $$\sigma(t;m1;k=1)=FT^{-1}\{\Phi(f;rec)/\Phi(f;ref/m1)\} \quad (2)$$

and examines the time behavior of $\sigma(t;m1;1)$. Where, as here, the FT in the denominator corresponds to the RS segment for the direct signal only (no multipath signal present) in the numerator, the magnitude $|\sigma(t;m1;1)|$ will have a relatively large magnitude peak ($\approx\sigma(max)=A$) at a value, t=t1, corresponding to arrival of the direct signal, and will decrease quickly to a small background value (having a mean value estimated as $n_1$) as the time difference |t−t1| increases. FIG. 3A graphically illustrates the magnitude $|\sigma(t;m1;1)|$ where only a direct signal is present in the frame.

Where a direct signal plus a multipath signal occur in a received frame, the combined signal can be represented approximately as $$s(t)=s(t;dir)+\chi\cdot e^{i\phi}\cdot s(t-\Delta t(mult);dir) \quad (3)$$

where s(t;dir) is the direct signal, $\chi\cdot exp(i\phi)$ is a complex number ($0<\chi<1$) representing the magnitude and phase angle of the multipath signal relative to the direct signal, and $\Delta t(mult)$ is an estimated time delay for arrival of the multipath signal relative to the direct signal. A Fourier transform corresponding to this combination of direct signal and multipath signal may be represented approximately as $$\Phi(f;rec)=\Phi(f;rec;dir)\{1+\chi\cdot exp\{-if\cdot\Delta t(mult)+i\phi\}\}, \quad (4)$$

where $\Phi(f;rec;dir)$ represents the Fourier transform of the direct signal alone. The corresponding function $\sigma(t;m1)$ for the additive combination of direct signal and multipath signal can be approximated as a sum of two functions, $$\sigma(t;m1;1)\approx\sigma(t;m1;1;dir)+\sigma(t;m1;1;multipath) \quad (5)$$

corresponding to the direct signal and the multipath signal (with an associated attenuation factor $\chi\cdot exp(i\phi)$). A magnitude for this approximation $|\sigma(t;m1;1)|$ for a combination of a direct signal and a multipath signal is illustrated in FIG. 3B. Presence of a direct signal plus a multipath signal is manifested by a first peak, of magnitude A, for the direct signal plus a second peak, displaced from the first peak and having a smaller peak magnitude $B\approx\chi\cdot A$ (<A), where both A and B are much larger than a representative magnitude $n_1$ of the background level, representing noise and other interference.

Figure 4A:
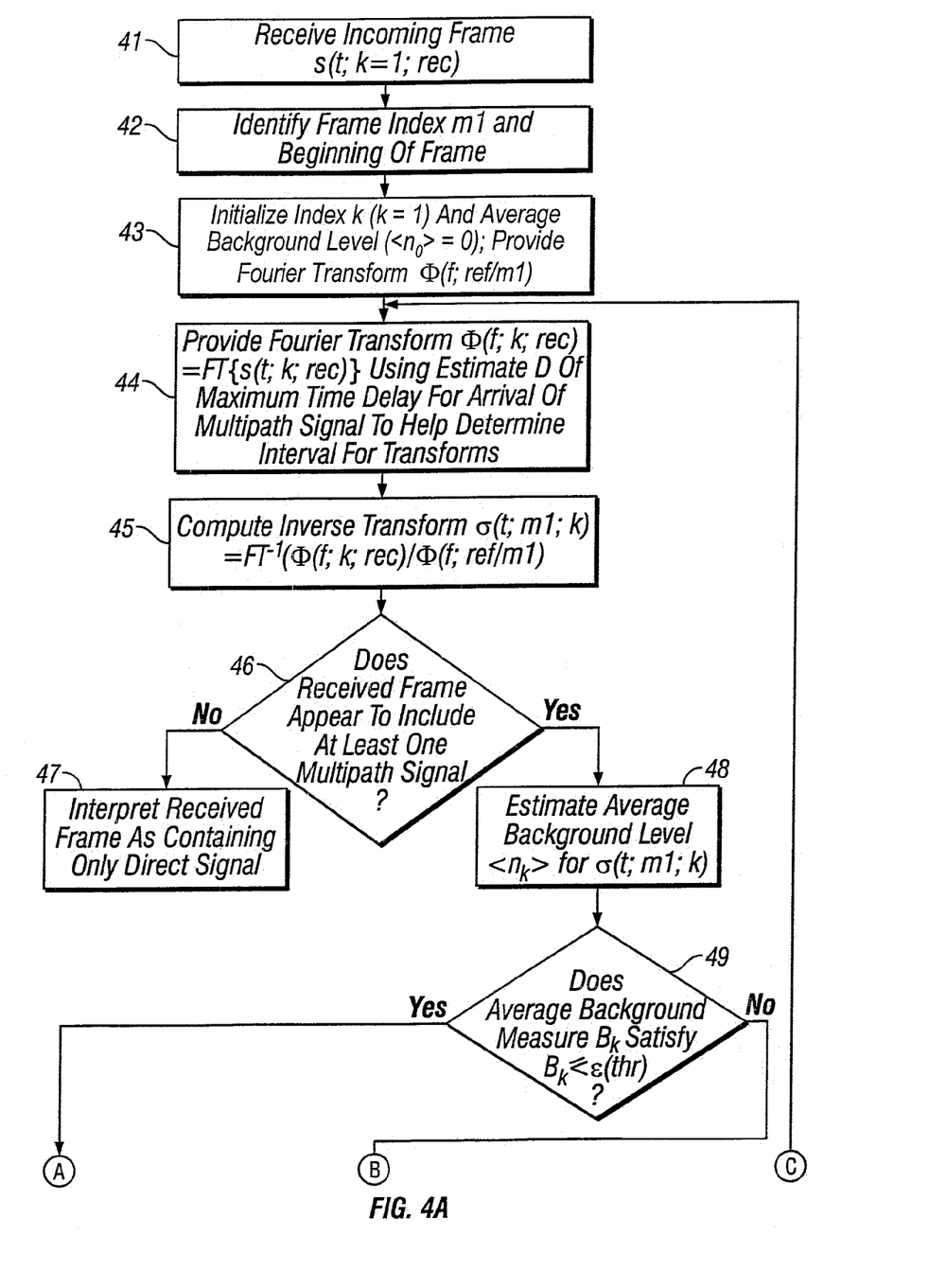
FIGS. 4A/4B and 6A/6B are flow charts of first and second procedures for practicing the invention.
Figure 4B:
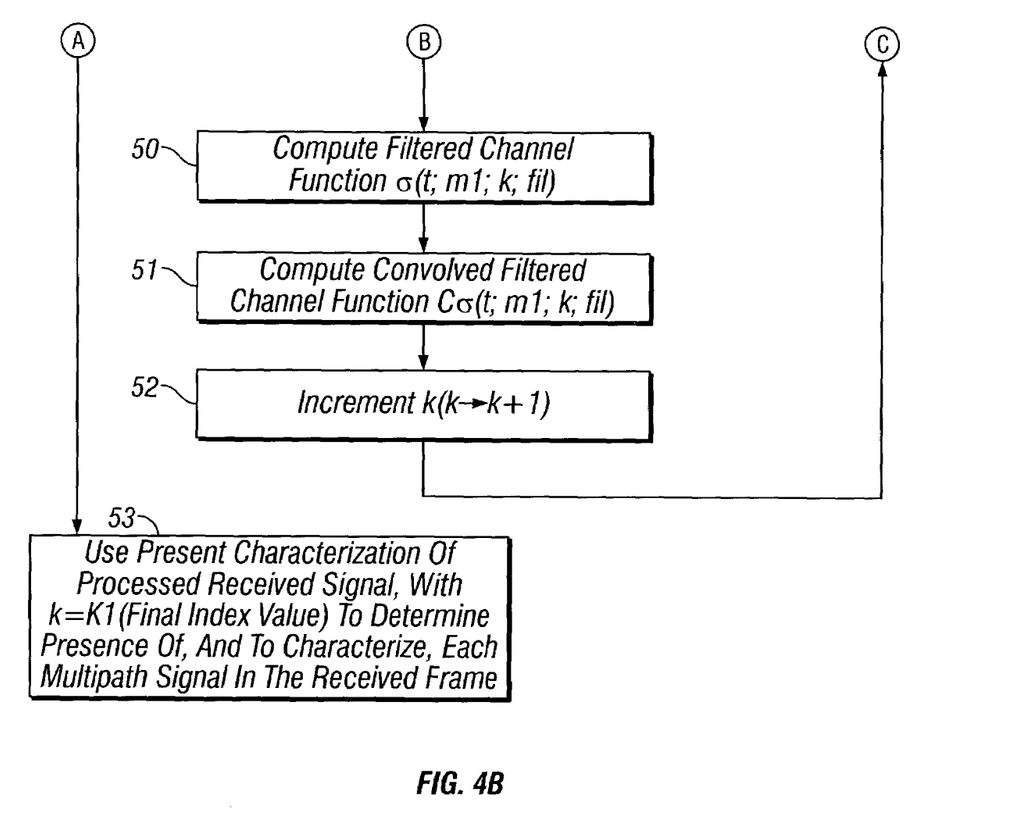

FIGS. 4A/4B are a flow chart illustrating a procedure for practicing the invention. In step 41, an incoming frame, or resulting frame, s(t;k;rec) is received (with k=1), which may, or may not, contain one or more multipath signals. The frame, without any multipath signal present, would have the structure shown in FIG. 1. In step 42, the frame index m1 for, and the beginning of, the received frame is identified. In step 43, a counting index k is set equal to 1 (k=1), an average background or noise level $<n_0>$ is optionally set equal to a selected value (e.g., 0), and a Fourier transform $\Phi(f;k;ref/m1)=FT\{RS(t;k;ref/m1)\}$ is computed or provided, using the IS (of length ≧L1+D). In step 44, the Fourier transform $\Phi(f;k;rec)=FT\{s(t;k;rec)\}$ is computed. In step 45, the inverse transform $\sigma(t;m1;k)=FT^{-1}\{\Phi(f;k;rec)/\Phi(f;k;ref/m1)\}$ of the ratio is computed, with k=1 initially.

The function magnitude $|\sigma(t;m1;k)|$ displayed in FIG. 3B includes a background or floor, with average amplitude $<n_k>$, representing the effect of noise and other background interferences, and N+1 amplitude peaks with magnitudes $>>|<n_k>|$, representing the direct signal and N multipath signals that are present in the received frame (N≧1), where N=0 and N=1 in FIGS. 3A and 3B, respectively.

The system moves to step 46 and estimates whether the reference frame appears to include at least one multipath signal. This estimation can be made, for example, by determining if at least two spaced apart peaks in the magnitude $|\sigma(t;m1;k)|$ are present (e.g., in the graph in FIG. 3B) that satisfy $<n_k><<\sigma(min)\leq|\sigma(t;m1;k)|$, where $<n_k>$ is an average of the background or floor level and $\sigma(min)$ is an estimated minimum value of $|\sigma(t;m1;k)|$ that corresponds to presence of a multipath signal. If the answer to the query in step 46 is "no," the system treats the processed frame signal s(t;k;rec) as containing only a direct signal, in step 47.

If the answer to the query in step 46 is "yes, the system moves to step 48, determines the average background $<n_k>$, and computes a background measure $B_k$, defined by $$B_k=a_k\cdot|<n_k>|+\ldots+a_1\cdot|<n_1>|+a_0\cdot|<n_0>|+b_{k-1}\cdot|<n_{k-1}>|-<n_k>|+\ldots+b_1\cdot|<n_1>-<n_2>|, \quad (6)$$

where each of the selected coefficients $a_p$ and $b_p$ (p=1, . . . , k) is non-negative and satisfies $$a_k+a_{k-1}+\ldots+a_1+a_0+b_{k-1}+b_{k-2}+\ldots+b_1=1. \quad (7)$$

In step 49, the system determines if the background level estimate $B_k$ is no greater than a selected threshold value $\epsilon(thr)$. If the answer to the query in step 49 is "yes," the system proceeds to step 53. If the answer to the query in step 49 is "no," the system proceeds to step 50.

In step 50, the system passes the function $\sigma(t;m1;k)$ through an amplitude-dependent filter that passes only signal amplitudes whose magnitude is larger than a selected threshold value $\sigma(thr)$, in order to remove most or all of the background interference. For example, one may choose $\sigma(thr)=r\cdot|<n_k>|$, where r=2–10 is a selected number, not necessarily an integer. The result is a (filtered) channel function $\sigma(t;m1;k;fil)$ that has no magnitudes below $\sigma(thr)$.

The filtered channel further σ(t;m1;k;fil) is to satisfy the following requirements:

$$\sigma(t; m1; k; fil) = \sigma(t; m1; k) \text{ (if } |\sigma(t; m1; k)| > \sigma(thr)) \quad (8A)$$

$$= 0 \text{ (if } |\sigma(t; m1; k)| \leq \sigma(thr)), \quad (8B)$$

Figure 5:
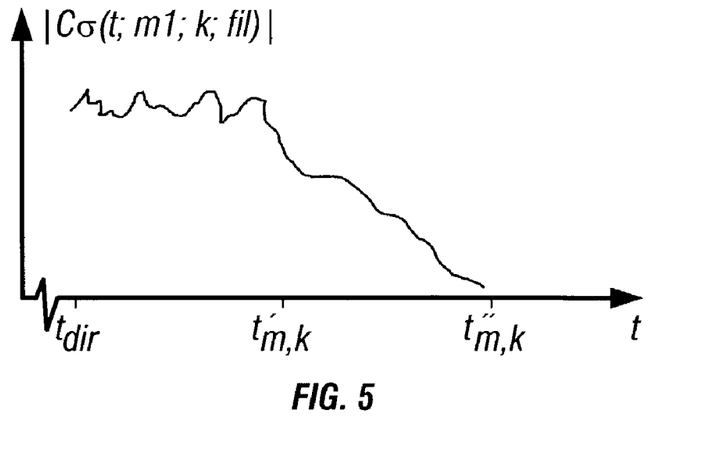
FIGS. 5 and 7 illustrate effects of presence of a spillover multipath signal from a preceding frame.

In step 51, the system forms a convolution of the interrogation segment (IS) of the RS sequence with the channel function σ(t;m1;k;fil) to provide a convolved channel function, $$C\sigma(t;m1;k;fil)=\sigma(t;k;fil)*RS(t;m1), \quad (9)$$

which may resemble the signal shown in FIG. 5.

In FIG. 5, the magnitude |Cσ(t;m1;k;fil)| is relatively large over a first portion of the IS, $t_{dir} \leq t \leq t'_{m,k}$, after which this magnitude significantly decreases from this constant value and tends toward 0 at a second time value, $t=t''_{m,k}$ (>$t'_{m,k}$), that is preferably within the IS for the received frame. A time difference, $\Delta t(2)=t''_{m,k}-t_{dir}$, provides an estimate of a refined IS interval length, $(L1+D_k)\cdot\Delta t(sym)$. Optionally, the system estimates the first and second time values, $t=t'_{m,k}$ and $t=t''_{m,k}$, and computes a new estimate, $D_k$, of the quantity D. In a preferred embodiment, this refined estimate of L1+D is not required, as discussed herein.

In step 52, the system increments k (k→k+1), returns to step 44 and repeats the steps 44–52, using a new estimate, Φ(f;k+1;rec)=FT{s(t;k+1;rec)} for the Fourier transform, where the modified received signal is defined as $$s(t; k+1; \text{rec}) = s(t; k; \text{rec}) \quad (t \leq t'_{m,k}) \quad (10A)$$

$$= C\sigma(t; m1; k; fil) \quad (t > t'_{m,k}) \quad (10B)$$

and the computation interval is the IS, as before. From FIG. 5, the quantity s(t;k+1;rec) is effectively zero for $t>t''_{m,k}$. In the new cycle, the Fourier transform Φ(f;ref/m1)=FT{RS(t;m1)} is unchanged from the preceding cycle.

In step 53, reached from step 49, the system (1) uses the present (final) characterization of the received signal (with final index value k=K1) to determine the presence of, and to characterize, each multipath signal whose presence is manifested in the illustration in FIG. 3B, and terminates the processing of the original received frame s(t;rec).

The magnitude |σ(t;m1;k)| illustrated in FIG. 3B may include more than two peaks above the threshold s(thr), indicating that more than one multipath signal is present. Presence of more than one multipath signal in the received frame will affect the structure of the convolution Cσ(t;m1;k;fil) shown in FIG. 5. The strength of a multipath signal, present in the received frame, may be estimated from the magnitude of |σ(t;m1;k)| in FIG. 3B for a peak that does not correspond to the direct signal.

As noted in the preceding, a pseudo-noise sequence or any other unique symbol sequence can be used for the RS sequence and for the corresponding RS sequence in the computations.

The procedure discussed in the preceding implicitly assumes that a multipath signal, if present in the received frame, arises from and is generated by information (RS and/or data) contained in the presently received frame. However, a multipath signal will also arrive (late) from the preceding received frame and "spill over" into the presently received frame over an interval $t_{dir} < t < t'''_{m,k}$. In this situation, this spillover multipath signal will include, not a multipath signal including the RS sequence from the preceding frame, but a multipath signal including a final portion of the data from the preceding frame. The final portion of data from the preceding frame, processed by the procedure indicated in FIGS. 4A/4B and indicated as s(t;K1';prec), is assumed to be known reasonably accurately, either through application of the procedure set forth in FIGS. 4A/4B, or through another approach.

Figure 6A:
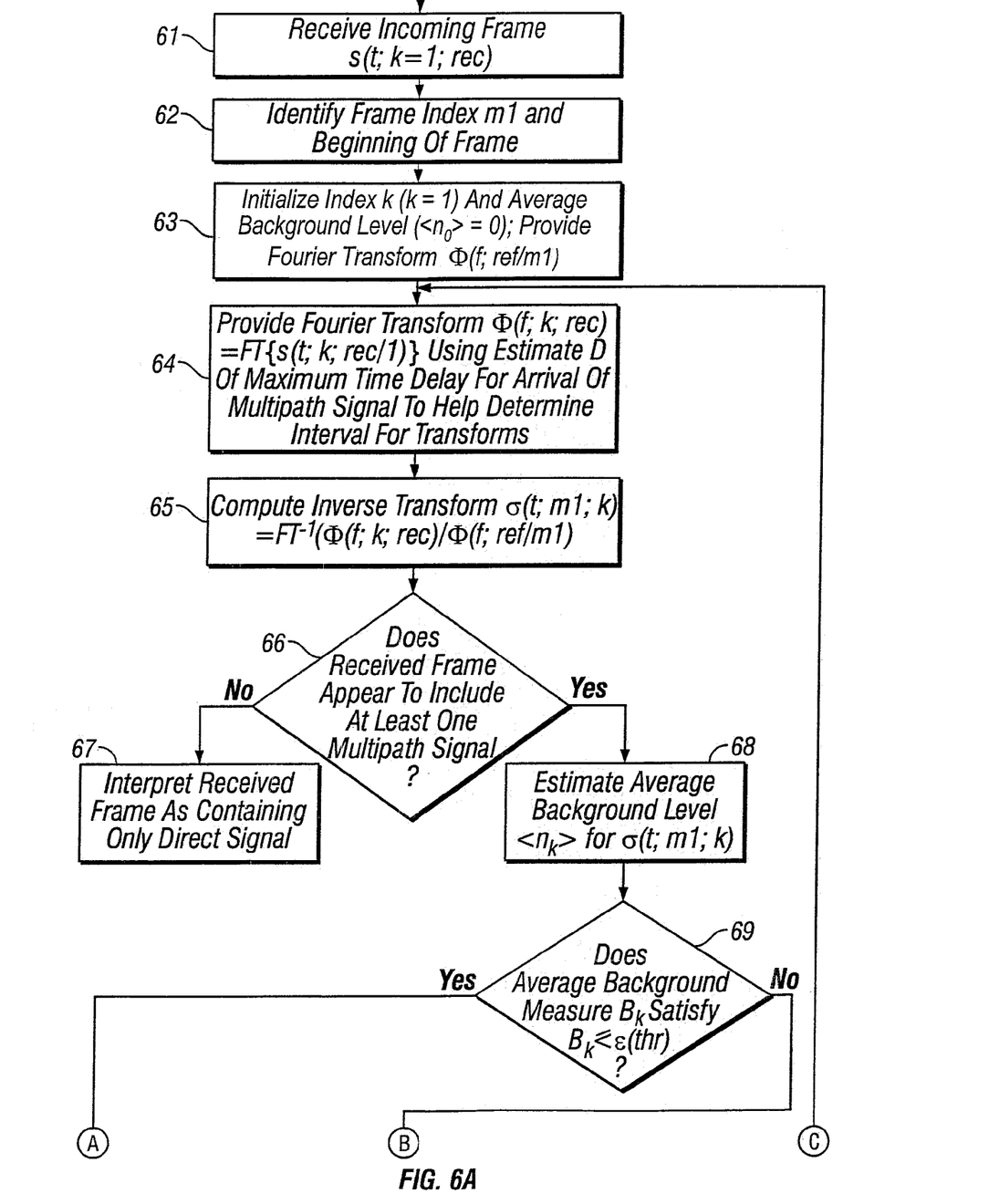
Figure 6B:
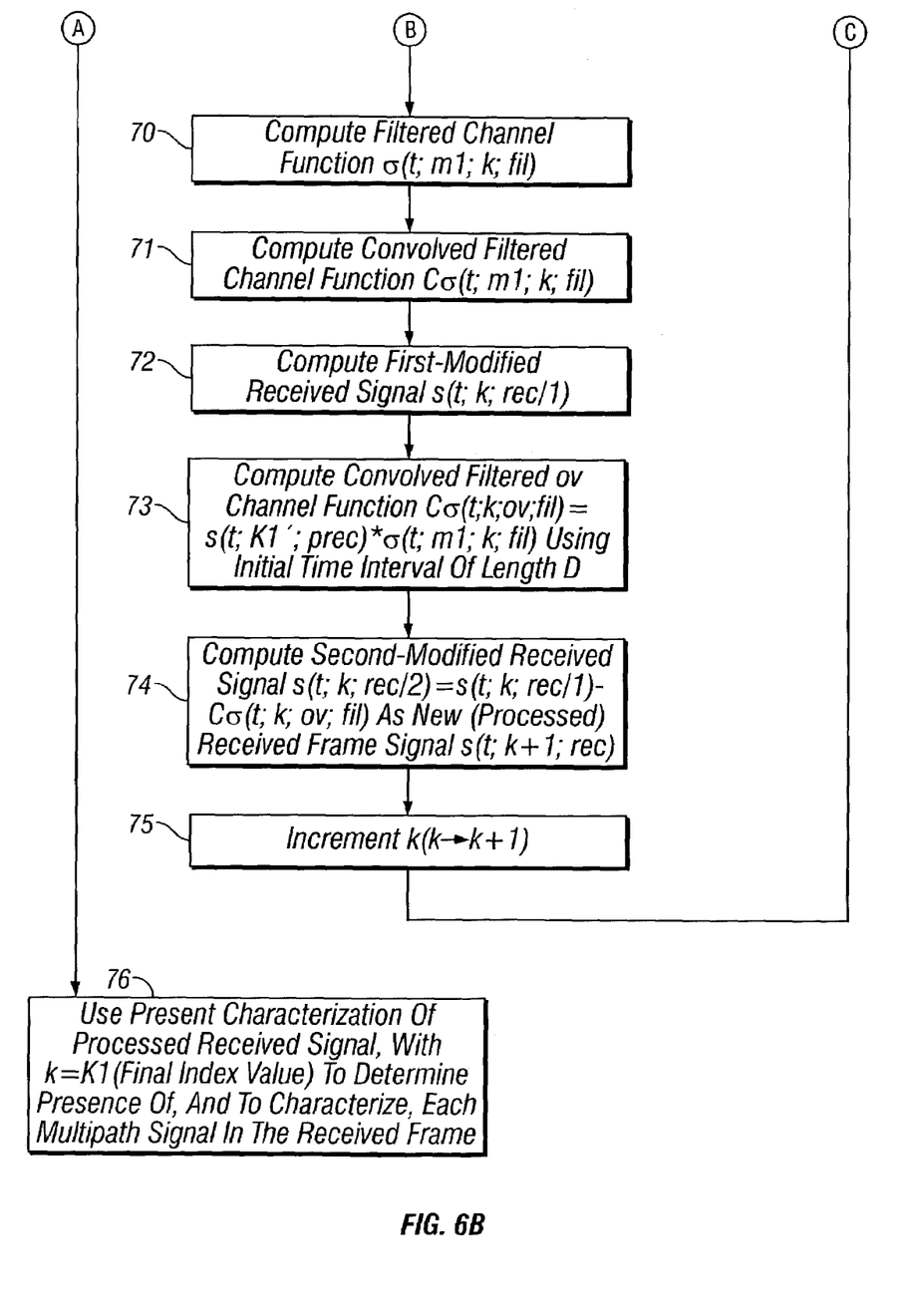

FIGS. 6A/6B illustrate an augmented procedure that can be followed to refine the analysis to examine the effects of a spillover multipath signal from a preceding frame. In step 61, an incoming frame, or resulting frame, s(t;k;rec) is received (with k=1), which may, or may not, contain one or more multipath signals. As in FIGS. 4A/4B, the frame, without any multipath signal present, would have the structure shown in FIG. 1. In step 62, the frame index m1 for, and the beginning of, the received frame is identified. In step 63, a counting index k is set equal to 1 (k=1), an average background or noise level $<n_0>$ is optionally set equal to a selected value (e.g., 0), and a Fourier transform Φ(f;k;ref/m1)=FT{RS(t;k;ref/m1)} is computed or provided, using the IS. In step 64, the Fourier transform Φ(f;k;rec)=FT{s(t;k;rec)} is computed. In step 65, the inverse transform σ(t;m1;k)=FT$^{-1}${Φ(f;k;rec)/Φ(f;k;ref/m1)} of the ratio is computed, with k=1 initially.

In FIGS. 6A/6B as in FIGS. 4A/4B, the function magnitude |σ(t;m1;k)| displayed in FIG. 3B includes a background or floor, with average amplitude $<n_k>$, representing the effect of noise and other background interferences, and N+1 amplitude peaks with magnitudes $>>|<n_k>|$, representing the direct signal and N multipath signals that are present in the received frame (N≧1).

The system moves to step 66 and estimates whether the reference frame appears to include at least one multipath signal. This estimation can be made, for example, by determining if at least two spaced apart peaks in the magnitude |σ(t;m1;k)| are present (e.g., in the graph in FIG. 3B) that satisfy $<n_k><<\sigma(\min)\leq|\sigma(t;m1;k)|$, where $<n_k>$ is an average of the background or floor level and σ(min) is an estimated minimum value of |σ(t;m1;k)| that corresponds to presence of a multipath signal. If the answer to the query in step 66 is "no," the system treats the processed frame signal s(t;k;rec) as containing only a direct signal, in step 67.

If the answer to the query in step 66 is "yes," the system moves to step 68, determines the average background $<n_k>$, and computes a background measure $B_k$, defined in Eqs. (6) and (7). In step 69, the system determines if the background level estimate $B_k$ is no greater than a selected threshold value ε(thr). If the answer to the query in step 69 is "yes," the system proceeds to step 76. If the answer to the query in step 69 is "no," the system proceeds to step 70.

In step 70, the system passes the function σ(t;m1;k) through an amplitude-dependent filter that passes only signal amplitudes whose magnitude is larger than a selected threshold value σ(thr), in order to remove most or all of the background interference. For example, one may choose σ(thr)=r·|$<n_k>$|, where r=2–10 is a selected number, not necessarily an integer. The result is a (filtered) channel function σ(t;m1;k;fil) that has no magnitudes below σ(thr). Again, the filtered channel function σ(t;m1;k;fil) is to satisfy the requirements of Eqs. (8A) and (8B).

Figure 7:
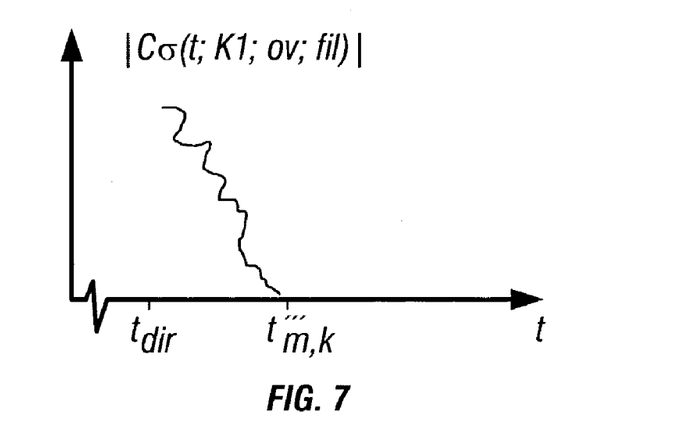

In step 71, the system forms a convolution of the interrogation segment (IS) of the RS sequence with the channel function σ(t;m1;k;fil) to provide a convolved channel function, Cσ(t;m1;fil) according to Eq. (9). In step 72, a first-modified received signal $$s(t; k; \text{rec}/1) = s(t; k; \text{rec}) \ (t \leq t'_{m,k}) \quad (11A)$$

$$= C\sigma(t; \text{ml}; k; \text{fil}) \ (t'_{m,k} < t \leq t''_{m,k}) \quad (11B)$$

is computed, and a final processed signal s(t;K1';prec) from the preceding frame is provided, with final index value k=K1'. In step 73, a convolved filtered ov channel function $$C\sigma(t;k;ov;fil)=s(t;K1';prec)*\sigma(t;m1;k;fil) \quad (12)$$

is computed, using the filtered channel function σ(t;m1;k;fil) already computed (in step 70) and using an initial time interval of length D in the present frame for the computation. Where an overlap multipath signal is present in the present in the presently received frame, the magnitude |Cσ(t;k;j;ov; fil)| of the convolution function will resemble the function illustrated in FIG. 7, where the time t=t'''$_{m,k}$ corresponds to a time at which an overlap multipath signal was last present in the presently received frame.

In step 74, a second-modified received signal $$s(t; k; \text{rec}/2) = s(t; k; \text{rec}/1) - C\sigma(t; k'ov'fil) \ (t \leq t'_{m,k}) \quad (13A)$$

$$= s(t; k; \text{rec}/1) \ (t > t'_{m,k}) \quad (13B)$$

is computed and used as a new (processed) received function, denoted s(t;k+1;rec). In step 75, the index k is incremented (k→k+1), and the system returns to step 64.

Figure 8:
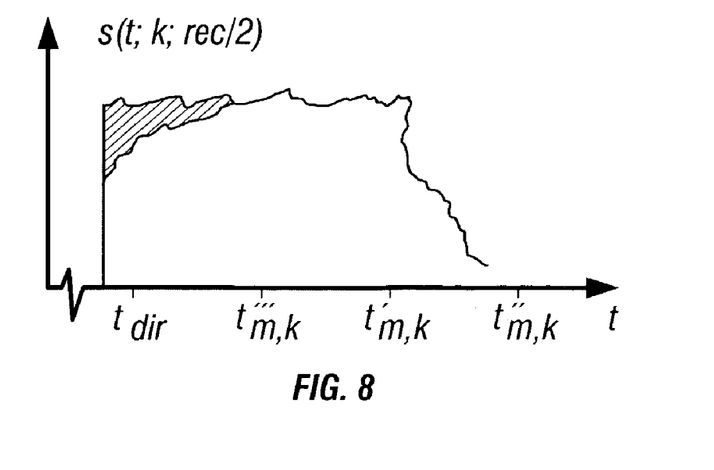
FIG. 8 illustrates effects of presence of a multipath signal arising from a preciding frame and from the presently received frame.

The lower curve in FIG. 8 represents the new (processed) received function s(t;k+1;rec)=s(t;k;rec/2), and the cross-hatched region for the time interval $t_{dir}<t<t'''_{m,k}$ represents the subtraction of the convolved function Cσ(t;k;ov;fil) implemented in Eqs. (13A) and (13B). The portion of the curve for the time interval $t'_{m,k}<t<t''_{m,k}$ in FIG. 8 represents the effects of presence of the multipath signal characterized by the procedure in FIGS. 4A/4B, or by the first portion of the procedure in FIGS. 6A/6B.

In step 76, which is reached from step 69, the system uses the present (final) characterization of the received signal s(t;K1;rec) (with final index value k=K1) to determine the presence of, and to characterize, each multipath signal whose presence is manifested in the illustration in FIG. 3B, and terminates the processing of the original received frame s(t;rec).

What is claimed is:

1. A method for assessing presence of a multipath signal, the method comprising:
   (1) receiving a digital signal frame, of length at least L1+L2, expressed in temporal units Δt(sym) of length of a symbol, that includes a distinguishing reference symbol (RS) sequence RS(t;m1) of length L1 and a data sequence of length L2, where m1 is an index value for the RS sequence corresponding to the received frame;
   (2) identifying the index value m1 from the RS sequence;
   (3) setting an integer k=1, setting an initial background level estimate $n_0$=0, providing an initial signal s(t;k=1; rec)=s(t;rec), and providing a first Fourier transform Φ(f;ref/m1)=FT{RS(t;m1)}, corresponding to a selected interrogation segment (IS) portion for the received frame, where f is a frequency variable, the IS portion is of length L1+D and includes the RS sequence for the frame, and D is a selected positive number;
   (4) providing a second Fourier transform Φ(f;k;rec)=FT{s (t;k;rec)}, corresponding to the IS of the signal s(t;k; rec);
   (5) computing an inverse Fourier transform σ(t;m1;k) =FT$^{-1}$ {Φ(f;k;rec)/Φ(f;ref/m1)} of the ratio of the first and second Fourier transforms;
   (6) estimating whether the received frame includes at least one multipath signal from an examination of σ(t;m1;k);
   (7) when the received frame is estimated to contain at least one multipath signal:
   (8) estimating an average value $<n_k>$ for a background level for the inverse Fourier transform σ(t;m1;k);
   (9) determining whether an average background level measure $B_k$ of the average background level $<n_k>$ satisfies $B_k \leq \epsilon(\text{thr})$, where $\epsilon(\text{thr})$ is a first selected positive value;
   (10) when $B_k$ does not satisfy $B_k \leq \epsilon(\text{thr})$:
   (11) computing a filtered channel function σ(t;m1; k;fil) that is equal to σ(t;m1;k) if |σ(t;m1;k)| >σ(thr), and is equal to 0 if |σ(t;m1;k)| <σ(thr), where σ(thr) is a second selected positive value;
   (12) computing a convolved filtered channel function Cσ(t;m1;k;fil) of the filtered channel function σ(t;m1;k;fil) with RS (t;m1);
   (13) computing a modified received signal $$s(t;k;rec/1)=s(t;k;rec)(t \leq t1)=C\sigma(t;m1;k;fil)(t>t1),$$

where t1 is a selected value of t, determined in part by the length D and identifying s(t;k;rec/1) with a processed signal s(t;k+1;rec);
   (14) incrementing k(k→k+1) and returning to step (4); and
   (15) when $B_k$ satisfies $B_k \leq \epsilon(\text{thr})$, using a present version s(t;k;rec) of the received frame, with k=K1=present value of the index k, to determine presence of, and to characterize, at least one multipath signal present in the received frame.

2. The method of claim 1, further comprising: when said received frame is estimated to not contain at least one multipath signal, processing the received frame to obtain a direct signal.

3. The method of claim 1, further comprising choosing said average background level measure $B_k$ to be $$B_k=a_k \cdot |<n_k>|+ \ldots +a_1 \cdot |<n_1>|+a_0 \cdot |<n_0>|$$

$$+b_{k-1} \cdot |<n_{k-1}>-<n_k>|+ \ldots +b_1 \cdot |<n_1>-<n_2>|,$$

where $a_p$ and $b_p$ (p=1, ..., k) are selected non-negative numbers satisfying $$a_k+a_{k-1}+ \ldots +a_1+a_0+b_{k-1}+b_{k-2}+ \ldots +b_1=1.$$

4. The method of claim 1, wherein said process of estimating whether said received frame includes said at least one multipath signal comprises:
   providing a positive value σ(min), representing a minimum of an expected peak value of a magnitude |σ(t; m1;k)|;
   determining an integer number N of spaced apart values, t=$t_{p,k}$, of a time variable t, at which |σ($t_{p,k}$;m1;k)| attains a local maximum value at least equal to σ(min); and
   when N≥2, interpreting this condition as indicating that said received frame includes said at least one multipath signal.

5. The method of claim 4, further comprising:
when $N \leq 1$, interpreting this condition as indicating that said received frame does not include said at least one multipath signal.

6. A method for assessing presence of a multipath signal, the method comprising:
(1) receiving a digital signal frame, of length at least $L1+L2$, expressed in temporal units $\Delta t(sym)$ of length of a symbol, that includes a distinguishing reference symbol (RS) sequence $RS(t;m1)$ of length L1 and a data sequence of length L2, where m1 is an index value for the RS sequence corresponding to the received frame;
(2) identifying the index value m1 for the RS sequence;
(3) setting an integer k=1, setting an initial background level estimate $n_0=0$, providing an initial signal $s(t;k;rec)=s(t;rec)$, providing a selected processed received signal $s(t;K1';prec)$ for the preceding frame, and providing a first Fourier transform $\Phi(f;ref/m1)=FT\{RS(t.m1)\}$, corresponding to a selected interrogation segment (IS) portion for the received frame, where f is a frequency variable, the IS portion is of length $L1+D$ and includes the RS sequence for the frame, and D is a selected positive number;
(4) providing a second Fourier transform $\Phi(f;k;rec)=FT\{s(t;k;rec)\}$, corresponding to a selected IS;
(5) computing an inverse Fourier transform $\sigma(t;m1;k)=FT^{-1}\{\Phi(f;k;rec)/\Phi(f;ref/m1)\}$ of the ratio of the first and second Fourier transforms;
(6) estimating whether the received frame includes at least one multipath signal from an examination of $\sigma(t;m1;k)$;
(7) when the received frame is estimated to contain at least one multipath signal:
(8) estimating an average value $<n_k>$ for a background level for the inverse Fourier transform $\sigma(t;m1;k)$;
(9) determining whether an average background level measure $B_k$ of the average background level $<n_k>$ satisfies $B_k \leq \epsilon(thr)$, where $\epsilon(thr)$ is a first selected positive value;
(10) when $B_k$ does not satisfy $B_k \leq \epsilon(thr)$:
(11) computing a filtered channel function $\sigma(t;m1;k;fil)$ that is equal to $\sigma(t;m1;k)$, if $|\sigma(t;m1;k)|>\sigma(thr)$, and is equal to 0 if $|\sigma(t;m1;k)|<\sigma(thr)$, where $\sigma(thr)$ is a second selected positive value;
(12) computing a first convolved filtered channel function $C\sigma(t;m1;k;fil)$ of the filtered channel function with $RS(t;m1)$ corresponding to the selected IS;
(13) computing a first-modified received signal $$s(t;k;rec/1)=s(t;k;rec) \ (t \leq t1)$$

$$=C\sigma(t;m1;k;fil) \ (t>t1),$$

where t1 is a selected value of t, determined in part by the length D;
(14) computing a second convolved filtered channel function $C\sigma(t;k;ov;fil)$ of the filtered channel function with $s(t;K1';prec)$;
(15) computing a second-modified received signal $s(t;k;rec/2)=s(t;k;rec/1)-C\sigma(t;k;ov;fil)$, and identifying $s(t;k;rec/2)$ with a processed signal $s(t;k+1;rec)$; and
(16) incrementing $k(k \to k+1)$ and returning to step (4); and
(17) when $B_k$ satisfies $B_k \leq \epsilon(thr)$, using a present version $s(t;k;rec)$ of the received frame, with k=K1=present value of the index k, to determine presence of, and to characterize, at least one multipath signal present in the received frame.

7. The method of claim 6, further comprising: when said received frame is estimated to not contain at least one multipath signal, processing the received frame to obtain a direct signal.

8. The method of claim 6, further comprising choosing said average background level measure $B_k$ to be $$B_k=a_k>|+\ldots+a_1 \cdot |<n_1>|+a_0 \cdot |<n_0>|$$

$$+b_{k-1} \cdot |<n_{k-1}>-<n_k>|+\ldots+b_1 \cdot |<n_1>-<n_2>|,$$

where $a_p$ and $b_p$ are selected non-negative numbers satisfying $$a_k+a_{k-1}+\ldots+a_1+a_0+b_{k-1}+b_{k-2}+\ldots+b_1=1.$$

9. The method of claim 6, wherein said process of estimating whether said received frame includes said at least one multipath signal comprises:
providing a positive value $\sigma(min)$, representing a minimum of an expected peak value of a magnitude $|\sigma(t;m1;k)|$;
determining an integer number N of spaced apart values, $t=t_{p,k}$, of a time variable t, at which $|\sigma(t_{p,k};m1;k)|$ attains a local maximum value at least equal to $\sigma(min)$; and
when $N \geq 2$, interpreting this condition as indicating that said received frame includes said at least one multipath signal.

10. The method of claim 9, further comprising:
when $N \leq 1$, interpreting this condition as indicating that said received frame does not include said at least one multipath signal.

11. A system for assessing presence of a multipath signal, the system comprising a computer that is programmed:
(1) to receive a digital signal frame, of length at least $L1+L2$, expressed in temporal units $\Delta t(sym)$ of length of a symbol, that includes a distinguishing reference symbol (RS) sequence $RS(t;m1)$ of length L1 and a data sequence of length L2, where m1 is an index value for the RS sequence corresponding to the received frame;
(2) to identify the index value m1 for the RS sequence;
(3) to set an integer k=1, set an initial background level estimate $n_0=0$, provide an initial signal $s(t;k=1;rec)=s(t;rec)$, and provide a first Fourier transform $\Phi(f;ref/m1)=FT\{RS(t;m1)\}$, corresponding to a selected interrogation segment (IS) portion for the received frame, where f is a frequency variable, the IS portion is of length $L1+D$ and includes the RS sequence for the frame, and D is a selected positive number;
(4) to provide a second Fourier transform $\Phi(f;k;rec)=FT\{s(t;k;rec)\}$, corresponding to the IS of the signal $s(t;k;rec)$;
(5) to compute an inverse Fourier transform $\sigma(t;m1;k)=FR^{-1}\{\Phi(f;k;rec)/\Phi(f;ref/m1)\}$ of the ratio of the first and second Fourier transforms;
(6) to estimate whether the received frame includes at least one multipath signal from an examination of $\sigma(t;m1;k)$;
(7) when the received frame is estimated to contain at least one multipath signal:
(8) to estimate an average value $<n_k>$ for a background level for the inverse Fourier transform $\sigma(t;m1;k)$;
(9) to determine whether an average background level measure $B_k$ of the average background level $<n_k>$ satisfies $B_k \leq \epsilon(thr)$, where $\epsilon(thr)$ is a first selected positive value;

(10) when $B_k$ does not satisfy $B_k \leq \epsilon(thr)$:
  (11) to compute a filtered channel function $\sigma(t;m1;k;fil)$ that is equal to $\sigma(t;m1;k)$ if $|\sigma(t;m1;k)| > \sigma(thr)$, and is equal to 0 if $|\sigma(t;m1;k)| < \sigma(thr)$, where $\sigma(thr)$ is a second selected positive value;
  (12) to compute a convolved filtered channel function $C\sigma(t;m1;k;fil)$ of the filtered channel function $\sigma(t;m1;k;fil)$ with $RS(t;m1)$;
  (13) to compute a modified received signal $$s(t;k;rec/1) = s(t;k;rec) (t \leq t1)$$

$$= C\sigma(t;m1;k;fil)(t \geq t1),$$

where t1 is a selected value of t, determined in part by the length D and identifying $s(t;k;rec/1)$ with a processed signal $s(t;k+1;rec)$;
  (14) to increment k ($k \to k+1$) and to return to (4); and
  (15) when $B_k$ satisfies $B_k \leq \epsilon(thr)$, to use a present version $s(t;k;rec)$ of the received frame, with $k=K1$=present value of the index k, to determine presence of, and to characterize, at least one multipath signal present in the received frame.

12. The system of claim 11, wherein said computer is further programmed so that, when said received frame is estimated to not contain at least one multipath signal, said computer processes the received frame to obtain a direct signal.

13. The system of claim 11, wherein said computer is further programmed to choose said average background level measure $B_k$ to be $$B_k = a_k \cdot |<n_k>| + \ldots + a_1 \cdot |<n_1>| + a_0 \cdot |<n_0>|$$

$$+ b_{k-1} \cdot |<n_{k-1}> - <n_k>| + \ldots + b_1 \cdot |<n_1> - <n_2>|,$$

where $a_p$ and $b_p$ (p=1, ..., k) are selected non-negative numbers satisfying $$a_k + a_{k-1} + \ldots + a_1 + a_0 + b_{k-1} + b_{k-2} + \ldots + b_1 = 1.$$

14. The system of claim 11, wherein said computer is further programmed to estimate whether said received frame includes said at least one multipath signal by an estimation process comprising:
  providing a positive value $\sigma(min)$, representing a minimum of an expected peak value of a magnitude $|\sigma(t;m1;k)|$;
  determining an integer number N of spaced apart values, $t = t_{p,k}$, of a time variable t, at which $|\sigma(t_{p,k};m1;k)|$ attains a local maximum value at least equal to $\sigma(min)$; and
  when $N \geq 2$, interpreting this condition as indicating that said received frame includes said at least one multipath signal.

15. The system of claim 14, wherein said estimation process further comprises:
  when $N \leq 1$, interpreting this condition as indicating that said received frame does not include said at least one multipath signal.

16. A system for assessing presence of a multipath signal, the system comprising a computer that is programmed:
  (1) to receive a digital signal frame, of length at least L1+L2, expressed in temporal units $\Delta t(sym)$ of length of a symbol, that includes a distinguishing reference symbol (RS) sequence $RS(t;m1)$ of length L1 and a data sequence of length L2, where m1 is an index value for the RS sequence corresponding to the received frame;
  (2) to identify the index value m1 for the RS sequence;
  (3) to set an integer k=1, to set an initial background level estimate $n_0=0$, to provide an initial signal $s(t;k;rec)=s(t;rec)$, to provide a selected processed received signal $s(t;K1';prec)$ for the preceding frame, and to provide a first Fourier transform $\Phi(f;ref/m1)=FT\{RS(t;m1)\}$, corresponding to a selected interrogation segment (IS) portion for the received frame, where f is a frequency variable, the IS portion is of length L1+D and includes the RS sequence for the frame, and D is a selected positive number;
  (4) to provide a second Fourier transform $\Phi(f;k;rec) = FT\{s(t;k;rec)\}$, corresponding to a selected IS;
  (5) to compute an inverse Fourier transform $\sigma(t;m1;k) = FT^{-1}\{\sigma(f;k;rec)/\Phi(f;ref/m1)\}$ of the ratio of the first and second Fourier transforms;
  (6) to estimate whether the received frame includes at least one multipath signal from an examination of $\sigma(t;m1;k,)$
  (7) when the received frame is estimated to contain at least one multipath signal:
  (8) to estimate an average value $<n_k>$ for a background level for the inverse Fourier transform $\sigma(t;m1;k)$;
  (9) to determine whether an average background level measure $B_k$ of the average background level $<n_k>$ satisfies $B_k \leq \epsilon(thr)$, where $\epsilon(thr)$ is a first selected positive value;
  (10) when $B_k$ does not satisfy $B_k \leq \epsilon(thr)$:
    (11) to compute a filtered channel function $\sigma(t;m1;k;fil)$ that is equal to $\sigma(t;m1;k)$, if $|\sigma(t;m1;k)| > \sigma(thr)$, and is equal to 0 if $|\sigma(t;m1;k)| < \sigma(thr)$, where $\sigma(thr)$ is a second selected positive value;
    (12) to compute a first convolved filtered channel function $C\sigma(t;m1;k;fil)$ of the filtered channel function with $RS(t;m1)$ corresponding to the selected IS;
    (13) to compute a first-modified received signal $$s(t;k;rec/1) = s(t;k;rec)(t \leq t1)$$

$$= C\sigma(t;m1;k;fil) (t > t1),$$

where t1 is a selected value of t, determined in part by the length D;
    (14) to compute a second convolved filtered channel function $C\sigma(t;k;ov;fil)$ of the filtered channel function with $s(t;K1';prec)$;
    (15) to compute a second-modified received signal $s(t;k;rec/2) = s(t;k;rec/1) - C\sigma(t;k;ov;fil)$, and identifying $s(t;k;rec/2)$ with a processed signal $s(t;k+1;rec)$; and
    (16) to increment $k(k \to k+1)$ and to return to (4); and
    (17) when $B_k$ satisfies $B_k \leq \epsilon(thr)$, to use a present version $s(t;k;rec)$ of the received frame, with $k=K1$=present value of the index k, to determine presence of, and to characterize, at least one multipath signal present in the received frame.

17. The system of claim 16, wherein said computer is further programmed so that, when said received frame is estimated to not contain at least one multipath signal, said computer processes the received frame to obtain a direct signal.

18. The system of claim 16, wherein said computer is further programmed to choose said average background level measure $B_k$ to be $$B_k = a_k \cdot |<n_k>| + \ldots + a_1 \cdot |<n_1>| + a_0 \cdot |<n_0>|$$

$$b_{k-1} \cdot |<n_{k-1}> - <n_k>| + \ldots + b_1 \cdot |<n_1> - <n_2>|,$$

where $a_p$ and $b_p$ ($p=1, \ldots, k$) are selected non-negative numbers satisfying $$a_k + a_{k-1} + \ldots + a_1 + a_0 + b_{k-1} + b_{k-2} + \ldots + b_1 = 1.$$

19. The system of claim 16, wherein said computer is further programmed to estimate whether said received frame includes said at least one multipath signal by an estimation process comprising:

providing a positive value σ(min), representing a minimum of an expected peak value of a magnitude |σ(t; m1;k)|;

determining an integer number N of spaced apart values, $t = t_{p,k}$, of a time variable t, at which |σ($t_{p,k}$;m1;k)| attains a local maximum value at least equal to σ(min); and when N≥2, interpreting this condition as indicating that said received frame includes said at least one multipath signal.

20. The system of claim 19, wherein said estimation process further comprises:

when N≤1, interpreting this condition as indicating that said received frame does not include said at least one multipath signal.

* * * * *